United States Patent [19]

Narula et al.

[11] Patent Number: 5,431,012
[45] Date of Patent: Jul. 11, 1995

[54] SYSTEM FOR MONITORING THE PERFORMANCE OF AUTOMOTIVE CATALYSTS

[75] Inventors: Chaitanya K. Narula, Ann Arbor; Andrew A. Adamczyk, Jr., Dearborn, both of Mich.

[73] Assignee: Ford Motor Company, Dearborn, Mich.

[21] Appl. No.: 270,616

[22] Filed: Jul. 5, 1994

[51] Int. Cl.6 ............................................... F01N 3/20
[52] U.S. Cl. ........................................ 60/276; 60/277; 60/285
[58] Field of Search ............... 60/274, 276, 277, 285, 60/307

[56] References Cited

U.S. PATENT DOCUMENTS

| | | |
|---|---|---|
| 3,882,451 | 6/1975 | Fujikshiro et al. |
| 4,319,451 | 3/1982 | Tajima .................. 60/285 |
| 4,656,829 | 4/1987 | Creps .................... 60/277 |
| 4,729,220 | 3/1988 | Terasaka ............... 60/277 |
| 5,060,473 | 10/1991 | Nakagawa . |
| 5,255,511 | 10/1993 | Maus et al. . |

FOREIGN PATENT DOCUMENTS 0236659  9/1987  European Pat. Off. .
2643739  3/1978  Germany .
8900439  4/1989  WIPO .

*Primary Examiner*—Ira S. Lazarus
*Assistant Examiner*—Daniel J. O'Connor
*Attorney, Agent, or Firm*—Lorraine S. Melotik; Roger L. May

[57] ABSTRACT

This invention is directed to a system for monitoring the efficiency of a catalyst employed to convert exhaust gases containing carbon monoxide, hydrocarbons and nitrogen oxides, e.g., those generated by an internal combustion engine such as in an automobile. The system comprises a thin-film resistive device and an electrical circuit connected to said thin-film resistive device capable of determining a change in the electrical resistance of a electrically conductive material provided in the device, the electrical resistance being subject to change during conversion of said exhaust gases over the catalyst.

13 Claims, 1 Drawing Sheet

SYSTEM FOR MONITORING THE PERFORMANCE OF AUTOMOTIVE CATALYSTS

Reference is made to commonly assigned related U.S. application Ser. No. 08/270617, entitled "ELECTRICALLY HEATABLE CATALYST DEVICE USING ELECTRICALLY CONDUCTIVE NON-METALLIC MATERIALS" to Narula et al., filed Ju. 5, 1994.

FIELD OF THE INVENTION

This invention is directed to a system which includes a thin-film resistive device for monitoring the performance of a catalyst in the device. More particularly, the resistive device is of a calorimetric type which employs catalyst located near a thin-film of an electrically conductive material whose change in resistance is responsive to the change in heat evolved during the redox reactions of the exhaust gases passing over the catalyst during operation of the device.

BACKGROUND OF THE INVENTION

Catalytic systems are employed in automotive vehicles to convert exhaust gas components like carbon monoxide, nitrogen oxides and hydrocarbons into other more environmentally desirable gases. Generally, such systems employ three-way catalysts (TWC) to catalyze such conversions and they operate efficiently at temperatures greater than about 350° C. As these TWC age, however, their performance deteriorates. Unacceptably reduced performance of the catalyst is usually detected when a vehicle fails to pass an emission test which is conducted periodically. It is now sometimes required by legislation to include a monitoring device into the automobile system to assess the performance of the catalyst on a continuous basis during operation of the vehicle. Such "on-board" monitoring would allow the catalyst to be replaced when its performance was shown to be less than acceptable. A device which would operate in such a monitoring system must be able to reproducibly and accurately function for an extended period of time in the harsh environment of automotive exhaust gas systems, in particular within the catalytic converter. Further, this desired device should be capable of being employed within a cost-efficient monitoring system capable of assessing the performance of an individual catalyst brick while imposing a minimum restriction on the design of the overall emissions control system. The present invention catalyst monitoring system meets these objectives.

DISCLOSURE OF THE INVENTION

This invention is directed to a catalyst monitoring system useful to determine the efficiency of a catalyst to convert gases containing carbon monoxide, hydrocarbons and nitrogen oxides, which catalyst monitoring system comprises: a thin-film resistive device comprising an electrically insulating substrate, a thin layer of an electrically conductive material selected from the group consisting of carbides, nitrides, silicides, and metal oxides applied on a surface of the substrate, a washcoat carried on a surface of the electrically conductive material, and a catalyst carried on a surface of the washcoat; and an electrical circuit means, connected to the thin-film resistive device, capable of determining a change in the electrical resistance of the electrically conductive material.

The redox chemistry of exhaust gases which occurs over a catalyst typically results in evolution of heat. Since this invention comprises a thin-film of electrically conductive material located near the catalyst, the evolved heat during catalysis of the gases causes a change in the temperature of this thin-film material and correspondingly its resistivity. This change of resistivity of the electrically conductive material can be translated into performance of the catalyst, as is discussed in detail below. The invention device is particularly useful employed within catalytic converters of internal combustion engine exhaust systems, e.g., as in an automobile exhaust gas system. Preferably, the electrically conductive material comprises a metal oxide like fluorine-doped tin oxide or tin oxide-doped indium oxide. The catalyst preferably is selected from noble metals or mixtures thereof, i.e, catalysts expected to be employed in the exhaust gas conversion system of an automobile.

BRIEF DESCRIPTION OF THE DRAWINGS

FIG. 4 is a graph showing the resistance-temperature relationship of a device according to an embodiment of this invention having tin oxide doped indium oxide as the electrically conductive material.

DETAILED DESCRIPTION OF PREFERRED EMBODIMENTS

Figure 1:
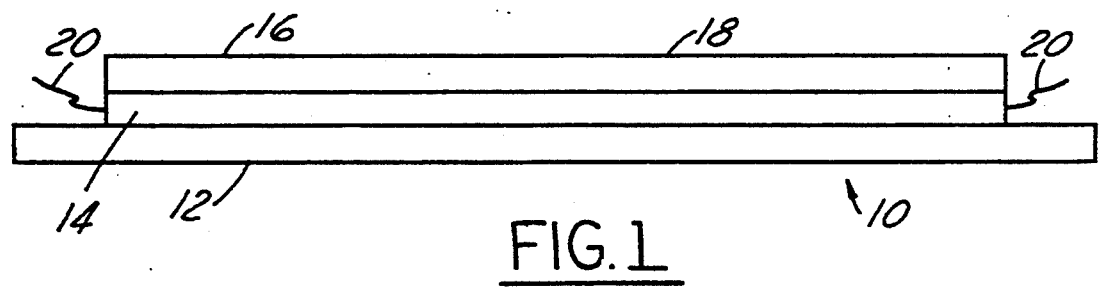
FIG. 1 is a schematic of a thin-film resistance device according to an embodiment of the system invention.

This invention can be readily understood with reference to the figures. In FIG. 1, the thin-film resistance device 10 according to an embodiment of the invention catalyst monitoring system comprises an electrically insulating substrate 12 on which is applied a thin-film of electrically conductive material 14. A washcoat 16 is located on the electrically conductive material 14. The washcoat 16 carries a catalyst 18 on its surface.

The substrate 12 of the thin-film resistance device 10 is made of any electrically insulating material including, but not limited to, materials such as cordierite, mullite, etc. The substrate may be in any suitable configuration, most preferably being of a planar shape. The substrate may also be of a configuration compatible with its possible location within a catalytic converter in which it may be integrated or imbedded. Still other insulating materials and configurations useful in this invention and suitable for use in a high temperature environment as automotive exhaust gas systems will be apparent to those skilled in the art in view of the present disclosure.

The electrically conductive material 14 is selected from the group consisting of metal oxides, carbides, nitrides, and silicides. Exemplary of such materials are metal oxides like fluorine doped tin-oxide, tin-oxide doped indium oxide, indium-tin-oxide, and vanadium oxide, the first two oxides being preferred oxides; nitrides like titanium nitride or silicon nitride; carbides like silicon carbide; and silicides like molybdenum silicide. Still other such electrically conductive materials of the types disclosed above useful in the present invention will be apparent to those skilled in the art in view of the present disclosure. The resistance of the electrically conductive material is not critical but preferably the resistivity is less than about 100 ohms, more preferably less than 50 ohms, at 0° C. The resistivity of the material layer is established, in part, by means of the chosen thickness of the layer as is known to those skilled in the art.

The electrically conductive material 14 is generally applied as a thin-film having preferably a layer thickness of less than about 5000 Angstroms, more preferably being between about 1000 and 5000 Angstroms. Optimally, such materials as disclosed herein for this layer 14 have excellent durability in the harsh environment encountered by catalysts, particularly as used in exhaust gas systems, particularly automobile exhaust gas systems.

The thin-film electrically conductive material may be applied on the substrate by any suitable technique including sol-gel processing, sputtering, and chemical vapor deposition. Numerous patents and printed publications are available which disclose methods of providing a layer of, e.g., electrically conducting metal oxides, such as fluorine-doped tin oxide, on a substrate. Exemplary of one such patent is U.S. Pat. No. 4,547,400, the teachings of which are expressly incorporated by reference herein. Still other methods of applying a thin-film of the electrically conducting material on a surface of the substrate will be apparent to those skilled in the art in view of the present disclosure.

A washcoat 16 is preferably subsequently applied to the electrically conductive material 14, which acts as a protective layer for the thin-film metal oxide, followed by application thereon of the catalyst 18. The washcoat and catalyst may also be applied on the electrically conductive material as a single layer. As would be apparent from this disclosure, more than one washcoat and/or catalyst coating may be employed. Typically, the washcoat may be any electrically non-conductive material, e.g., ceramic materials such as alumina which typically when used in high temperature environments is often stabilized by means of additives like cerium oxide or barium oxide. In this invention, the washcoat may be any suitable material for carrying a catalyst including, but not limited to, materials like aluminum oxide, titanium oxide, silicon oxide, etc. or suitable mixtures thereof. The thickness of this washcoat layer 16 is generally less than about 10,000 Angstroms, preferably being between about 1,000 and 10,000 Angstroms. Thickness of the washcoat is not however critical; however, the thickness should not be too high to prevent measurements of thermal changes in the thin-film electrically conductive material layer as would be apparent to one skilled in the art in view of the present disclosure. The washcoat may be suitably applied, for example, by sol-gel technology, such technology being well known to those skilled the art. For example, a layer of titanium oxide may be deposited on the electrically conductive material by exposing it to a solution of titanium oxide sol prepared by acetylacetone modified titanium alkoxides.

The washcoat applied to the thin-film is then impregnated with or provided with a coating of a catalyst material which is suitable to convert the components of gases as described above, such as those from an internal combustion engine, into more desirable species. Such catalysts are well known to those skilled in the art. Exemplary of suitable catalysts include typical three-way catalysts, preferably being selected from the noble metals like platinum, palladium, rhodium and mixtures thereof. Still other catalyst materials include oxidation catalysts like silver, which may be impregnated on the washcoat using for example incipient wetness techniques or decomposition of organometallic compounds, using laser assisted deposition, from preformed catalyst suspended in alumina solution, or from the solutions of catalyst metals. The particular catalyst and method of providing it on the washcoat is not critical to this invention. The washcoat and catalyst may be applied in layers over the electrically conductive material or the washcoat and catalyst may be applied in a single layer over the electrically conductive material. In this later situation, the catalyst is first applied to the washcoat materials for a washcoat-catalyst combination and then the combination is applied over the electrically conductive thin-film. Desirably, the electrically conductive material is of the same approximate size (area) as the catalyst and is located generally directly below the area encompassed by the catalyst, for optimal monitoring efficiency of the device. As described above, the device may be integrated into, e.g., a portion the catalytic converter structure. In such a situation, the substrate carrying the thin-film layer could be positioned in the converter structure, e.g., in a wall of the honeycomb within the converter, after which a coating with the washcoat/catalyst described herein could be applied to the entire honeycomb structure. Thus, the thin-film would likewise be provided with such a washcoat/catalyst coating for the invention thin-film device.

As would be appreciated by those skilled in the art, during redox reactions over a catalyst of internal combustion engine exhaust gases like hydrocarbons, carbon monoxide and nitrogen oxides, whereby the first two are oxidized and the third reduced, heat evolves. The choice of an electrically and thermally insulating material for the substrate used in the present invention device prevents heat loss along the substrate so that the heat generated by the redox reactions over the catalyst is substantially transferred to the electrically conductive material since it is not dissipated through the substrate. Further, since the electrically conductive materials are non-metals, they do not readily loose their heat to the environment, avoiding errors which might be associated with rapid heat loss. The heat generated during the redox reactions results in a change in temperature of the electrically conductive material, which can then be accurately translated to a change in the electrical resistance of the electrically conductive material. Thus the change in the resistance of the thin-film material is a measure of the change in heat generated by the catalyst, which in turn provides a measure of the performance of the catalyst.

During operation, the device will be connected to an electrical circuit in order to determine a change in the electrical resistance of the electrically conductive material 14, as by the leads 20 shown in FIG. 1 separated by a distance and in contact with the electrically conductive material 14. As described above, the invention system finds advantageous use to monitor the performance of a catalyst used in automotive vehicles. This invention system can also be used in other ways as also mentioned above, i.e., for laboratory testing of catalysts in order to monitor conditions which accelerate catalyst deterioration. Still other uses will be apparent to those skilled in the art in view of the present disclosure.

The change in resistance can be detected and measured by an electrical circuit having such measuring ability, connected to the device. If the invention monitoring system has a device located in, e.g., an automotive exhaust system, this circuit can include sophisticated monitoring instruments such as the EEC on-board computer control often employed in the electrical systems of automotive vehicles. On the other hand, this circuit can be much simpler, particularly if this monitoring system invention is used in, e.g., a testing facility doing research on potential catalysts. The circuit can be of any design, only requiring instrumentation capable of measuring the change in resistance of the electrically conductive material upon exposure of the catalyst to gases to be converted by the catalyst. Such an electrical circuit might minimally comprise a voltage source and a ohm-meter wheatstom bridge. Still other embodiments of this electrical circuit would be apparent to those skilled in the art in view of the present disclosure.

As discussed above, the increase in temperature due to the catalytic conversion processes taking place in, e.g., an automotive catalytic converter, affects the resistance of the electrically conductive thin-film. The change in resistance of the thin-film can be measured and related to the catalyst performance since as the catalyst deteriorates, the conversion process is less efficient, and less heat is liberated causing a reduced temperature. As would be appreciated by those skilled in the art in view of this disclosure, this invention system can be configured to sense this lower temperature and it can be compared to a standard for a fully functioning catalyst. If the comparison yields a substantial difference, an indicator, on, e.g., the automotive vehicle or test equipment employing this invention system, could be activated which could provide an alert as to the deterioration of the catalyst.

This invention device can be installed in laboratory test equipment as discussed above or a portion of an exhaust gas system, such as that used to treat exhaust gases from an internal combustion engine; especially automotive engines. Desirably, when the system is used to monitor catalyst efficiency in automotive vehicles, the invention system device is located in the catalytic converter, either singly or in multiple, so as to be exposed to the same environment as the catalyst employed in the exhaust system. As would be apparent to those skilled in the art, in such situations the catalyst employed in the device and in the catalytic converter would be essentially the same.

Figure 2:
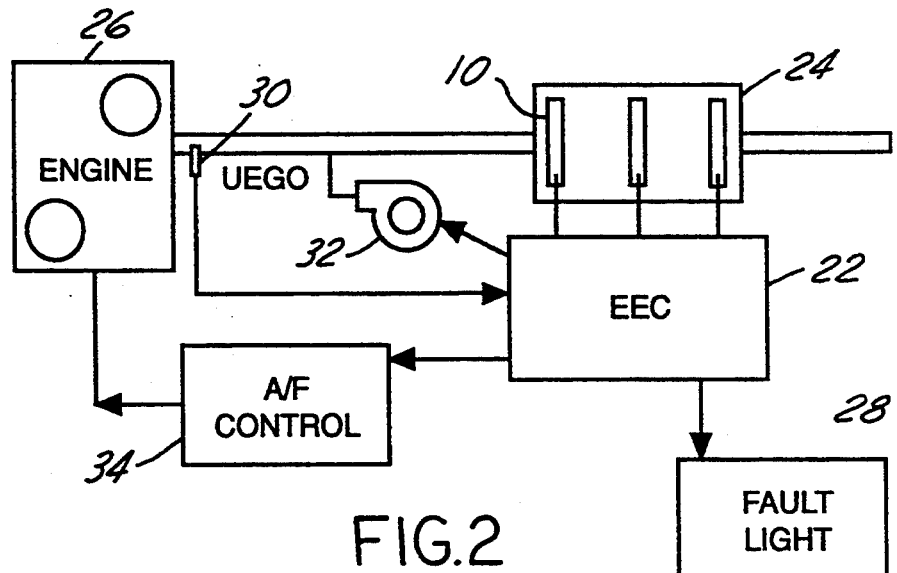
FIG. 2 is a schematic of an embodiment of a catalyst monitoring system according to this invention.
Figure 3:
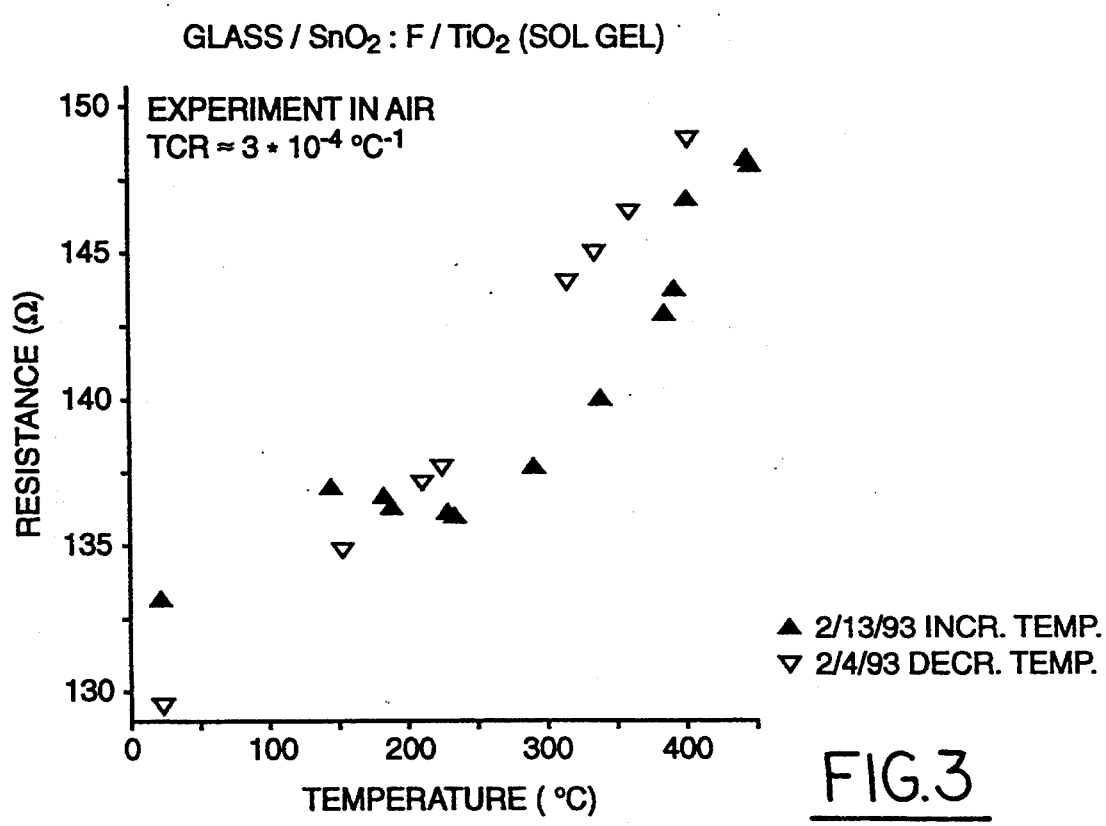
FIG. 3 is a graph showing the resistance-temperature relationship of a device according to an embodiment of this invention system having fluorine doped tin oxide as the electrically conductive material.

One such automotive application of the invention device can be used in a monitoring system according to an embodiment as shown in FIG. 2. Several thin-film devices 10 are shown placed within a catalytic converter 24. In this particular embodiment, the thin-film devices are integrated into the wall of the catalytic converter 24. As would be apparent, such devices may also be within the converter but not be integrated into the wall thereof. The number of devices used in such a situation is not critical, however, there may be an advantage to employing several. The devices can also be placed axially along the converter, as well. By using more than one of these devices, as is optimally desired, a more refined measurement would then ensue. The catalyst by its nature oxidizes the reductants CO, $H_2$ and HCs in the exhaust of an automotive vehicle. Also, upon aging of the catalyst, the catalyst is less efficient at the oxidation process, thus taking more catalyst to oxidize a given amount of reductant. Upon oxidation of these chemical species, heat is liberated in the catalyst and is manifested as a rise in the local temperature on the catalyst surface. This local temperature rise is sensed by our unique layers as a change in their electrical resistance. Upon calibration, as shown in FIGS. 3 and 4, this measurement of electrical resistance is directly related to the local temperature. With the placement of several at least two, of these conducting layers along the catalyst, the change in temperature due to the chemical oxidation process is measured and this change in temperature can be related to the amount of chemical conversion which occurs in the catalyst; an energy balance is performed. Since the term catalyst aging is a reflection of the reduced ability of the catalyst to convert these materials chemically, the change in temperature sensed by two of these materials is an indicator of the change in catalyst activity. The smaller the change in temperature, the less activity of the catalyst.

For the pictured embodiment system in FIG. 2, the electrical resistance of each device 10 located along the converter 24 exhaust path length is related to its temperature and can be monitored by the vehicle's on-board computer system 22, in this case being shown as an EEC module. Since the temperature rise or the location of the temperature rise along the catalytic convertor 24 is dependent on the concentration of emissions in the exhaust stream from the engine 26, the redox ratio at the catalyst 24 and the catalyst's performance, this temperature rise or its location in the catalytic converter 24 can be interpreted by the EEC 22 to determine global catalyst performance and can then trigger a fault light 28 to warn the vehicle operator of less than desirable catalyst efficiency. In this configuration, the UEGO sensor 30, the air blower 32, and the engine A/F ratio controller 34 are used to set specific redox conditions at the catalyst 24 for monitoring purposes.

As shown in FIG. 2, the UEGO sensor (30) or other indicators of engine A/F ratio can be used to define the mixture to the catalyst and the air-pump (32) can be used to assure a Redox ratio at the catalyst which is less than unity, thus assuring maximum oxidation of the reductants $H_2$, CO and HCs over the catalyst as would be apparent to those skilled in the art in view of the present disclosure. The outputs of these devices are then input into the on-board vehicle computer (22) and analyzed for the appropriate temperature rise across the catalyst. If the rise in temperature is too low, then an indicator light (28) is illuminated, thus warning the operator of a less than desirable emissions system functioning.

To use this device, the vehicle computer can place the engine of the vehicle in a predefined test condition, thus yielding a pre-specified inlet condition to the catalyst. It can also be programmed to a test mode which can measure the temperature change in the catalyst during normal operation. In this mode, whenever the speed and load of the vehicle is at a predefined condition, the resistance of each conductive layer could be measured and the temperature difference calculated in the on-board computer. This temperature difference at a predefined inlet condition to the catalyst is calibrated to the amount of chemical conversion across the catalyst, hence it activity. If the activity is below a preset level, the malfunction indicator light on the vehicle can be activated to warn the operator of an emissions system malfunction.

The sensor can also be used at a general operating condition of the vehicle, if the output of other sensors on the vehicle are used in conjunction with the output of this catalyst temperature sensor. As an example, the output of the mass air flow or throttle position or MAP sensors of the vehicle can supply a measurement of the flow rate across the catalyst, thus allowing other engine flow conditions to be included in the correlations which relate catalyst temperature change to its activity. Also the EGO or the UEGO or the prescribed A/F ratio setting available in the on-board computer can be used to supply the A/F ratio to the calculation procedure and this effect can be incorporated in the correlation procedure. In general, flow, A/F ratio and catalyst activity can be related to the temperature rise across the catalyst and these correlations can be applied by the on-board computer to assess a malfunction of the emission system.

According to one example of making the device, a thin layer of fluorine-doped tin oxide is coated to a thickness of about 3000 Angstroms on a glass substrate. Two gold leads are attached to the tin oxide layer by applying silver paste followed by pyrolysis in air. Subsequently, a coating of titanium oxide (washcoat) is provided on the tin oxide from a solution prepared by hydrolyzing titanium 2-propoxide in 2-propanol in the presence of 2 equivalents of acetylacetone. A catalyst prepared from Pt solution is applied on the titanium oxide washcoat. The device is then connected to an electronic bridge circuit to allow the measurement of its electrical resistance as a function of its temperature. It is subjected to an inert gas in an oven as the gas temperature is increased. It is found that the resistance of the device changes in proportion to the temperature as shown in FIG. 3. This shows that this combination of materials applied as mentioned in this disclosure can be used to sense the temperature applied to the material.

Another device is prepared on an alumina substrate from a solution obtained by dissolving indium tris(acetylacetonate) in tetrahydraforn, adding tin tetra-(2-propoxide), ethanolamine, and water. This device is provided with an alumina washcoat catalyst for operation according to this invention. Again the material is connected through gold leads to an electrical bridge circuit (a whetstone bridge circuit is one example) and placed in an oven. The temperature is raised and the resistance changes. This correlation between temperature and resistance was made and is shown in FIG. 4.

We claim:

1. A system useful to monitor the efficiency of a catalyst employed to convert exhaust gases containing carbon monoxide, hydrocarbons and nitrogen oxides, which system comprises:

a thin-film resistive device comprising an electrically insulating substrate, a thin layer of an electrically conductive material selected from the group consisting of carbides, nitrides, silicides, and metal oxides applied on a surface of the substrate, a washcoat carried on a surface of the electrically conductive material, and a catalyst carried on a surface of the washcoat; and an electrical circuit connected to said thin-film resistive device for determining a change in the electrical resistance of said electrically conductive material during conversion of said exhaust gases.

2. The system according to claim 1, wherein said metal oxides are selected from the group consisting of fluorine-doped tin oxide and tin oxide-doped indium oxide.

3. The system according to claim 2, wherein said electrically conductive material is less than about 5000 angstroms in thickness.

4. The system according to claim 1, wherein said washcoat is selected from the group of alumina and titanium oxide.

5. The system according to claim 4, wherein said washcoat further comprises stabilizers selected from barium oxide and cerium oxide.

6. The system according to claim 1, wherein said catalyst is selected from noble metals and mixtures thereof.

7. The system according to claim 1, wherein said device is employed within a exhaust gas system for an internal combustion engine.

8. The system according to claim 7, wherein said device is employed within a catalytic converter employed within the exhaust gas system.

9. The system according to claim 8, wherein said catalytic converter employs catalyst material therein substantially of the type of catalyst employed in said device.

10. The system according to claim 1, wherein said electrical circuit includes an electronic engine control.

11. The system according to claim 1, wherein the area covered by said electrically conductive material is located substantially below the area of the catalyst in said device.

12. The system according to claim 8, wherein said device is provided integrated into a portion of said catalytic converter.

13. The system according to claim 1, wherein said washcoat and said catalyst are applied together as a mixture onto said electrically conductive material.

* * * * *